(12) United States Patent
Elpermann et al.

(10) Patent No.: US 9,945,694 B2
(45) Date of Patent: Apr. 17, 2018

(54) ROTARY ANGLE SENSOR

(71) Applicant: Hella KGaA Hueck & Co., Lippstadt (DE)

(72) Inventors: Thomas Elpermann, Telgte (DE); Stefan Peters, Lippstadt (DE)

(73) Assignee: Hella KGaA Hueck & Co., Lippstadt (DE)

( * ) Notice: Subject to any disclaimer, the term of this patent is extended or adjusted under 35 U.S.C. 154(b) by 142 days.

(21) Appl. No.: 14/411,838

(22) PCT Filed: Jun. 29, 2013

(86) PCT No.: PCT/EP2013/063762
§ 371 (c)(1),
(2) Date: Feb. 5, 2016

(87) PCT Pub. No.: WO2014/005963
PCT Pub. Date: Jan. 9, 2014

(65) Prior Publication Data
US 2016/0146634 A1 May 26, 2016

(30) Foreign Application Priority Data
Jul. 4, 2012 (DE) .................. 10 2012 105 963

(51) Int. Cl.
*G01D 5/20* (2006.01)
*B60R 16/027* (2006.01)
(Continued)

(52) U.S. Cl.
CPC ............ *G01D 5/20* (2013.01); *B60R 16/027* (2013.01); *B62D 6/10* (2013.01); *B62D 15/0215* (2013.01); *G01D 11/18* (2013.01); *G01L 3/02* (2013.01)

(58) Field of Classification Search
CPC . G01D 5/20; G01D 11/18; B62D 6/10; B62D 15/0215; B60R 16/027; G01L 3/02;
(Continued)

(56) References Cited

U.S. PATENT DOCUMENTS 6,155,106 A * 12/2000 Sano ...................... B60R 16/027
33/1 N
7,015,688 B2 * 3/2006 Wolber .................. H03K 17/97
324/207.2
(Continued)

FOREIGN PATENT DOCUMENTS

DE   19601964 A1   7/1997
DE   19841960 C1   3/2000
(Continued)

*Primary Examiner* — Julian Huffman
*Assistant Examiner* — Michael Konczal
(74) *Attorney, Agent, or Firm* — Husch Blackwell LLP

(57) ABSTRACT

A rotary angle sensor used to determine a relative angular position as compared to a reference position, comprising a housing (1), at least one rotor (3, 4) that is rotatably mounted inside said housing (1), one circuit board (2) containing electrical and/or electronic components as well as one or multiple stators corresponding to the number of used rotors (3, 4). The rotary angle sensor is supposed to be improved in such a manner that a particularly precise alignment of the first rotor (3) in relation to the stator is ensured and that it is inexpensive to manufacture. This is achieved by a first rotor (3) that is interlocked with the housing (1) without any play while a pre-loaded spring washer (14) is positioned on the latching arms (11).

6 Claims, 3 Drawing Sheets

(51) Int. Cl.
  *B62D 6/10* (2006.01)
  *B62D 15/02* (2006.01)
  *G01D 11/18* (2006.01)
  *G01L 3/02* (2006.01)

(58) Field of Classification Search
  CPC ........ H02K 11/24; H02K 11/27; H02K 11/21; H02K 11/215; H02K 11/22; H02K 11/225
  See application file for complete search history.

(56) References Cited

U.S. PATENT DOCUMENTS

| | | | |
|---|---|---|---|
| 7,145,130 B2 * | 12/2006 | Sano | B62D 15/0215 250/231.13 |
| 7,445,451 B2 * | 11/2008 | Tanaka | B62D 15/022 439/15 |
| 7,758,363 B2 * | 7/2010 | Tanaka | B60R 16/027 439/15 |
| 2008/0054765 A1 * | 3/2008 | Siraky | G01D 5/24442 310/68 B |
| 2010/0182762 A1 * | 7/2010 | Itomi | G01D 5/24452 361/807 |
| 2015/0185005 A1 * | 7/2015 | Bartscht | G01C 9/06 33/365 |

FOREIGN PATENT DOCUMENTS

| | | | | |
|---|---|---|---|---|
| DE | 10065240 | A1 | 7/2002 | |
| DE | 10242252 | A1 | 3/2004 | |
| DE | 10354343 | A1 | 6/2005 | |
| EP | 1324003 | A2 | 7/2003 | |
| EP | 1219527 | A1 | 1/2004 | |
| EP | 1069025 | A2 | 11/2005 | |
| EP | 1533212 | B1 | 12/2006 | |
| EP | 1895277 | A1 * | 3/2008 | ......... G01D 5/24442 |
| EP | 2031355 | A2 | 3/2009 | |

* cited by examiner

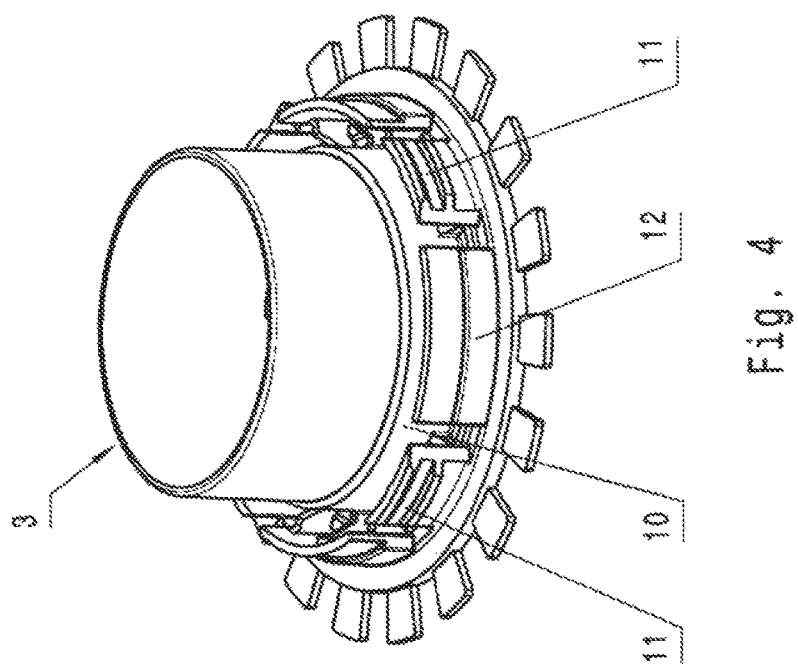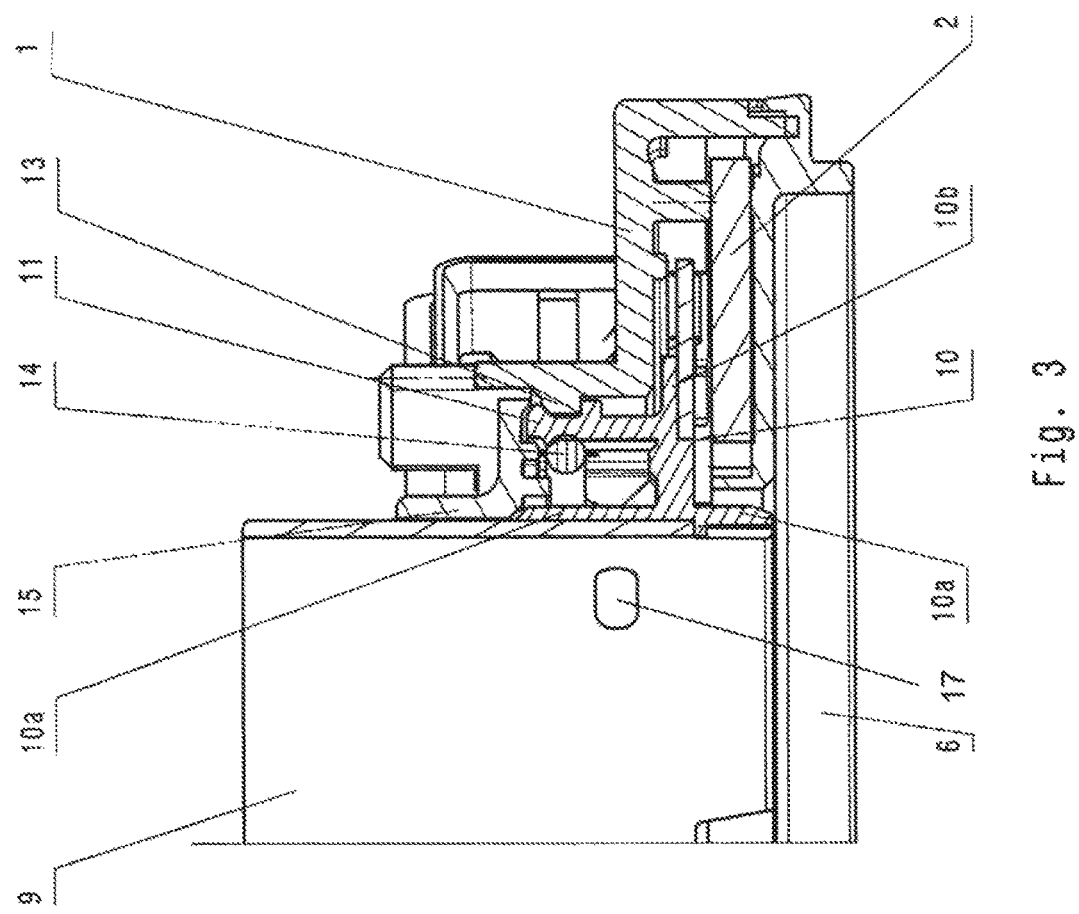

ROTARY ANGLE SENSOR

CROSS REFERENCE

This application claims priority to PCT/EP2013/063762, filed Jun. 29, 2013, which itself claims priority to German Application No. 10 2012 105963.2, filed Jul. 4, 2012, which are both hereby incorporated by reference.

FIELD OF TECHNOLOGY

The invention concerns a rotary angle sensor used to determine a relative angular position as compared to a reference position.

BACKGROUND

Such inductive torque sensor devices are generally considered known. They are, for example, being used in motor vehicles in order to determine torque values, such as steering torque. Such measures are becoming increasingly necessary, due to the fact that electromotive servos are being used as steering aids in more and more vehicles. These require the steering torque input for control purposes. The steering torques are determined by a torsion bar inside the steering column using angular differences and calculated from this information. To this end, twists at the end of the torsion bar are converted to electronic signals using a suitable arrangement and fed into other devices for evaluation purposes. The angular differences caused by torsion are to be determined independently of the position of the steering wheel.

It is additionally important for driver assistance systems, such as ESP (electronic stability program used to influence the driving behavior of the vehicle), to receive information as to the positioning of the steering wheel (relative angular position). For this purpose, the lock of the steering wheel (angle relative to a reference position) is determined. To allow for angles greater or less than 360° to be determined, the reference position is associated with an indexing system, which generates a signal for every full revolution of the steering wheel and thereby determines the number of revolutions performed by the steering wheel.

EP 1 533 212 B1 describes a steering angle sensor where a rotor is directly mounted on a circuit board. For this purpose, a bearing element is latched onto the circuit plate. A rotor structure is mounted on a counter-bearing ring which is rotatably mounted inside the bearing element. This is supposed to achieve an exact positioning of the rotor structure in relation to the circuit board. The effects of temperature and wear cannot be compensated for.

DE 10 2006 037 941 describes a steering sensor with a housing (supporting part) made of metal. A bearing ring is connected with the housing by a plastic connection. Manufacturing tolerances are to be minimized overall. The production process related to the housing is quite complex. The positioning of a rotor inside the housing is not described any further.

SUMMARY OF THE INVENTION

It is the objective of this invention to provide a rotary angle sensor that is capable of achieving a particularly precise alignment of one of the first rotors in relation to the stator and is, at the same time, inexpensive to manufacture.

A first rotor is interlocked with the housing without any play while a pre-loaded spring washer is positioned on the latching arms. Latching connections are particularly easy to install. A corresponding design of latching elements, such as latching springs and noses, prevents the latching connection from being subjected to play; this achieves a particularly precise positioning of the first rotor in relation to the stator and therefore an accurate determination of angles. The spring washer ensures that this precise positioning is maintained in spite of even high temperatures when the plastic becomes relatively soft and the pre-tensioning force applied by the latching springs is decreasing.

In one development of the invention, the bearing surfaces of the first rotor are positioned inside the housing between a latching nose and corresponding latching arms. These bearing surfaces ensure the axial positioning of the first rotor and thereby its distance to the associated stator. The bearing surfaces are small, so that there is only little friction when turning.

In another development, one of the bearing surfaces is provided on the first rotor and the housing using appropriately beveled surfaces. This ensures the radial positioning of the first rotor in relation to the stator. This measure also compensates for manufacturing tolerances and possible wear in a simple manner.

In another development, the bearing surfaces are provided with lubricant. Alternatively (or additionally) the housing and/or components of the first rotor should be made out of plastic with a certain portion of embedded lubricant. This serves to reduce friction.

In another development, a retaining ring is welded to the free ends of the bearing segments. This increases the stability of the rotor against disengaging from the housing.

To summarize, this invention provides rotary angle sensor that is very accurate throughout its service life, ensures a uniform degree of friction with regard to the rotatably mounted parts under all possible conditions and that does not generate any noise.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 3 is a vertical section through a part of the rotary angle sensor.

FIG. 4 shows a perspective view of a first rotor.

DETAILED DESCRIPTION OF THE DRAWINGS

Figure 1:
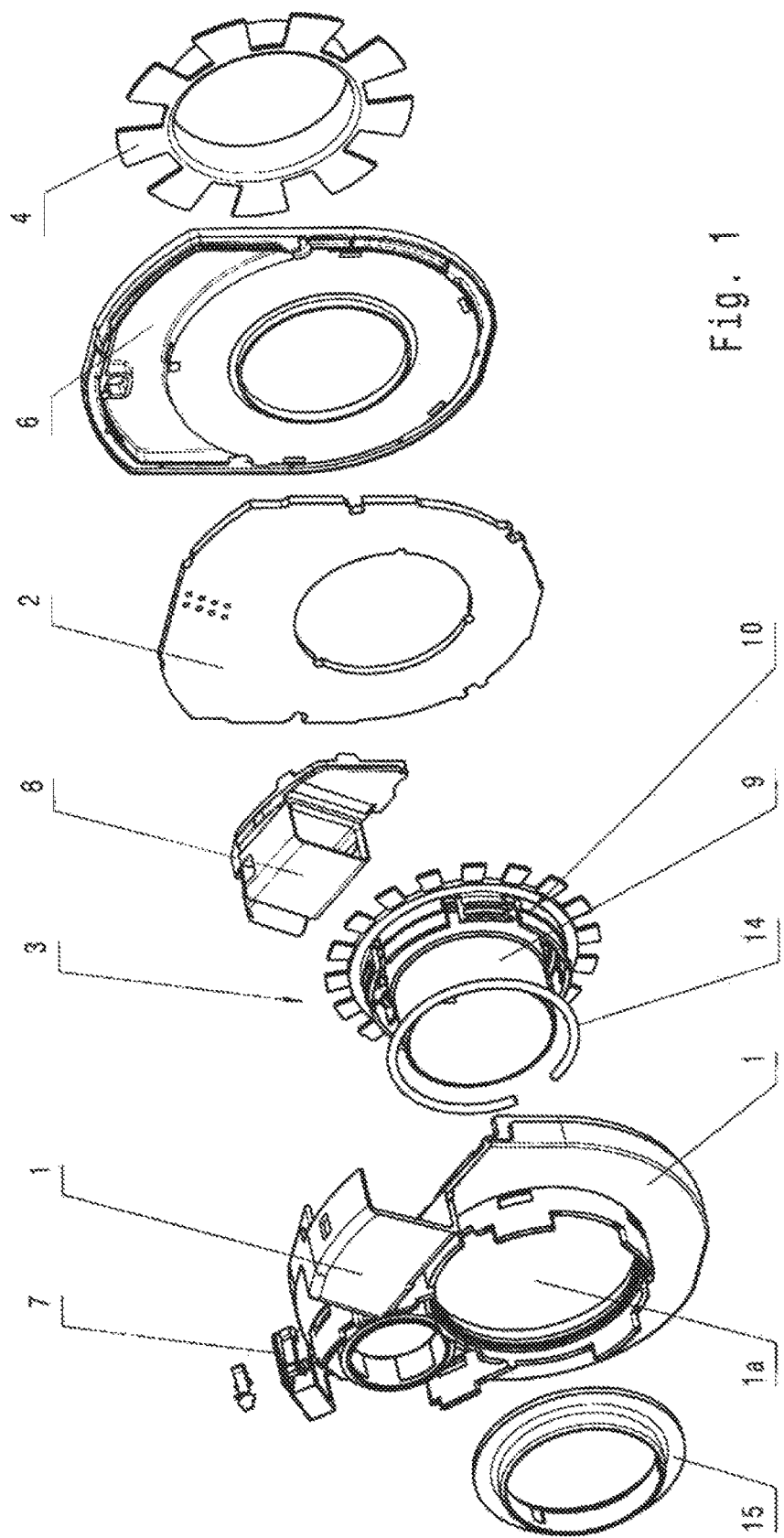
FIG. 1 shows an exploded view of the rotary angle sensor.
Figure 2:
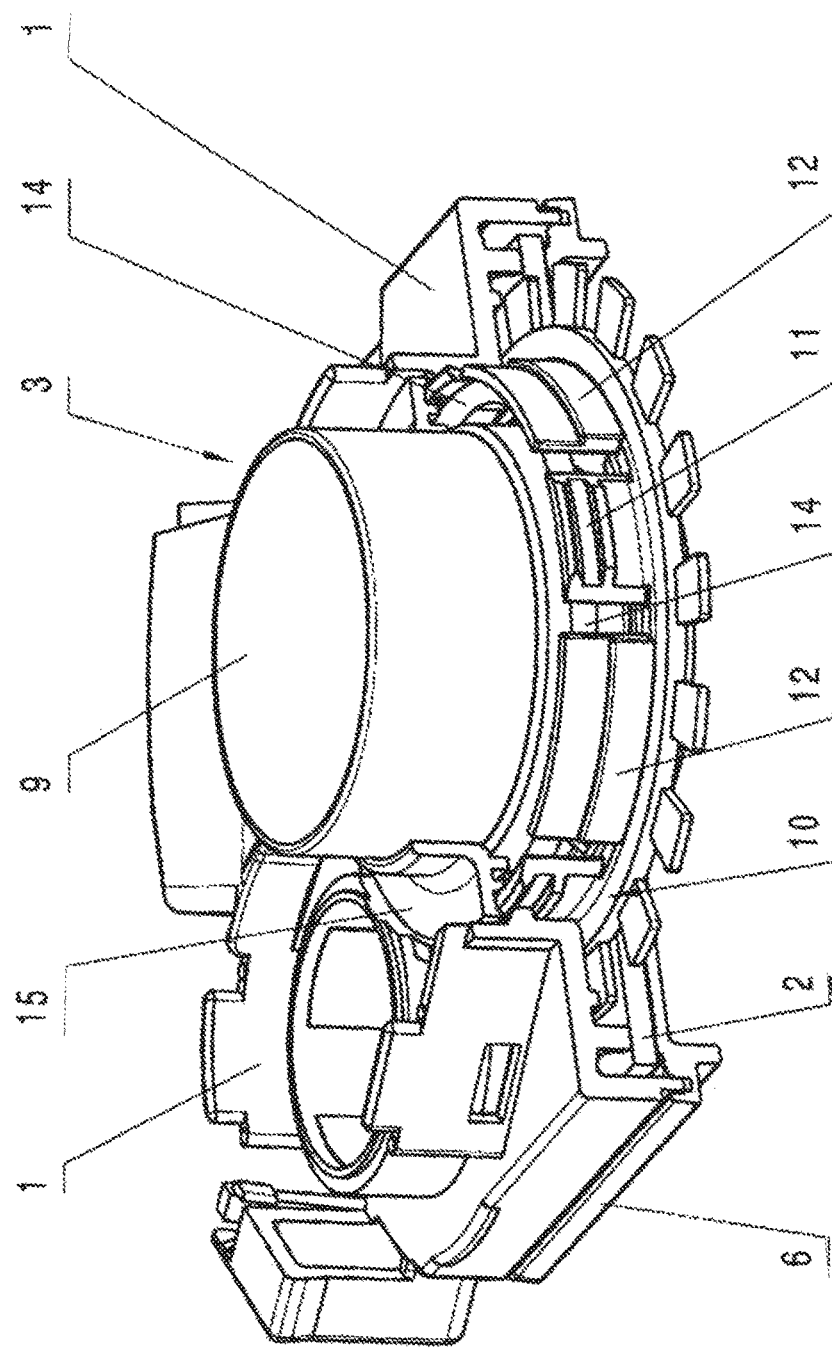
FIG. 2 shows a perspective view of one part of the rotary angle sensor.

As can be seen in FIGS. 1 to 3, the rotary angle sensor comprises a housing 1, on or inside which a circuit board (2) is installed as well as two rotors (3, 4) that are rotatably mounted. The two main surfaces of the housing (1) are both closed by one cover (6) each, one of which is not shown. The rotary angle sensor is, for example, assigned to a steering column when used in a motor vehicle, whereas the rotors (3, 4) co-rotate with the installation. The housing (1) has a corresponding circular opening (1a) that is centrally arranged (approximately). A circular latching nose (13) is provided. In the area of the opening (1a) of the housing (1) in such a manner that it projects into the opening (1a). In order to mount the housing (1) to a fixed part of a motor vehicle, a connecting piece (7) is provided so that the housing (1) is immobile in relation to the steering movement.

The circuit board (2) assigns the associated stators to the rotors (3, 4) using, for example, conducting paths as well as electrical and/or electronic components. The stators are concentrically arranged around a generally circular hole inside the circuit board (2), while this hole is concentric in relation to the opening (1a). The circuit board (2) is fitted to the housing (1) at an exactly predetermined position. A connector (8) is fitted to the circuit board (3) and electrically connected. It is held on the housing (1) when the rotary angle sensor is installed.

The first of the rotors (3) is particularly well visible in FIGS. 2 to 4. It comprises a first rotor structure, a sleeve (9) as well as a holder (10) on which the rotor structure and sleeve (9) are mounted.

The tubular sleeve (9) is made of sheet metal while the ends that come into contact with each other if bent are assembled from omega-shaped indentations and protrusions in a puzzle-like manner. The ends have to be additionally welded. The holder (10) is positioned on the outside of the sleeve by injection molding whereas a guiding cam is also provided on the inner side of the sleeve (9). This component serves as an additional safety measure against twisting between the first rotor (3) and a torsion element of the steering column. If the rotary angle sensor is mounted, the guiding cam (17) is guided within a corresponding axial groove of the torsion element.

The holder (10) is made out of a pipe section (10a) that also includes a ring disk (10b) that is mounted on the end (the lower one in FIGS. 1 to 4) and facing outside in such a manner that a right angle is formed between the two components. The first rotor structure is recessed into the lower area of the ring disk (10b) in such a manner that it sits flush with the lower area of the ring disk and radially protrudes out of the ring disk (10b) by a predetermined length and in a circular fashion. On the other, upper area of the ring disk (10b), latching arms (11) and bearing segments (12) are alternatingly arranged in such a manner that they are at a predetermined and constant radial distance to the pipe section (10a). The bearing segments (12) exhibit a slightly greater height than the latching arms (11). An outwardly directed latching groove is recessed into these, which is positioned in parallel with the ring disk (10b) and corresponds with the respective locking nose (13) of the housing (1). The bearing segments (12) are designed in such a manner that there is only little play in relation to the inner circumference of the latching nose (13). The latching arms (11) are slightly pre-tensioned against the latching nose (13).

This causes the first rotor (3) to be mounted in the exact predetermined position of the housing (1) so that the first rotor structure and the circuit board (3) assume a relative position in relation to the first stator that is exactly as intended. In this manner, the rotary angle can be determined to an especially precise degree.

To support the pre-tensioning measure, especially at higher temperatures and if subjected to ordinary wear and tear, a spring washer (14) made of metal is provided at the latching arms (11) and the bearing segments (12). The spring washer (14) is dimensioned in such a manner that it creates a predetermined degree of pre-tensioning against the latching arms (11) and the bearing segments (12).

A holding ring (15) is fitted to the upper end of the pipe section (10a) and concentrically at the upper ends of the bearing segments (12), the bottom side of which is designed in such a way that it stabilizes the latching arms (11). For this purpose, the upper ends of the bearing segments (12) are provided with some material overhang that can be welded to the holding ring (15) under heat.

The holding ring (15) may be designed as a first cogwheel. This component acts on a second cogwheel that is mounted on the housing (1). This mechanism can be used for both counting functions (counting of full or partial revolutions of the steering column) as well as for the implementation of absolute steering angle measurement functions.

The second rotor (4) is connected with the torsion element of the steering column in a non-rotatable manner. This rotor has a second rotor structure and is assigned to the second stator. The second rotor (4) is mounted outside of the housing (1) at a predetermined distance to the second stator.

LIST OF REFERENCE SIGNS

1 Housing
1a Opening
2 Circuit board
3 First rotor
4 Second rotor
5
6 Cover
7 Connecting part
8 Connector
9 Sleeve
10 Holder
10a Pipe section
10b Ring disk
11 Latching arm
12 Bearing segment
13 Latching nose
14 Spring washer
15 Holding ring
16
17 Guiding cam

The invention claimed is:

1. A rotary angle sensor used to determine a relative angular position in relation to a reference position, said rotary angle sensor comprising:
at least one rotor including a holder on which the at least one rotor is mounted, the holder including a first side and a second side opposite the first side, said holder extending from the first side to the second side in a first direction, wherein the at least one rotor is mounted on the first side of the holder;
a housing on which the holder and a first of the at least one rotor are rotatably mounted;
a circuit board installed to the housing, the circuit board including electronic components and one or multiple stators corresponding to the available number of rotors;
at least one latching arm that extends from the first side of the holder away from the second side of the holder in a second direction opposite the first direction; and
a spring washer pretensioned against the at least one latching arm.

2. The rotary angle sensor of claim 1, wherein at least one bearing segment of the first rotor is provided inside the housing between a latching nose of the housing and the at least one latching arm.

3. The rotary angle sensor of claim 2, wherein at least one of the bearing segments is formed by correspondingly beveled surfaces on the first rotor and the housing.

4. The rotary angle sensor of claim 2 wherein the bearing segments are provided with a lubricant.

5. The rotary angle sensor of claim 1 wherein at least one of the housing and the components of the first rotor are made of plastic with a portion of embedded lubricant.

6. The rotary angle sensor of claim 1 wherein a holding ring is welded to free ends of the bearing segments.

* * * * *